Aug. 13, 1935. E. H. LANIER Re. 19,665

AEROPLANE

Original Filed May 27, 1932 4 Sheets-Sheet 1

Inventor
Edward H. Lanier.
By Albert E. Deterich
Attorney

AEROPLANE

Original Filed May 27, 1932 4 Sheets-Sheet 2

Inventor
Edward H. Lanier.
By Albert E. Dieterich
Attorney

AEROPLANE

Original Filed May 27, 1932 4 Sheets-Sheet 3

Inventor
Edward H. Lanier.
By Albert E. Dieterich
Attorney

AEROPLANE

Original Filed May 27, 1932 4 Sheets-Sheet 4

Inventor
Edward H. Lanier.

By Albert R. Dieterich
Attorney

Reissued Aug. 13, 1935 Re. 19,665

UNITED STATES PATENT OFFICE 19,665

AEROPLANE

Edward H. Lanier, Covington, Ky.

Original No. 1,913,809, dated June 13, 1933, Serial No. 613,993, May 27, 1932. Application for reissue June 5, 1935, Serial No. 25,189

30 Claims. (Cl. 244—12)

My invention which relates to the Vacuplane type of heavier-than-air machines (see my Letters Patent 1,750,529 issued March 11, 1930, 1,779,005 issued October 21, 1930 and 1,813,627 issued July 7, 1931) has for an object to provide a small practical low-priced plane with a higher degree of inherent stability and lower landing speed than has heretofore been obtained, in order to place a plane within the reach (from the standpoint of first cost and maintenance) of the average person.

Further, it is an object to provide such a plane with either an open or covered cock pit as may be desired, the open cock pit being illustrated in the specific embodiment shown in the accompanying drawings.

Further, it is an object to provide an aeroplane of the type above referred to in which there is a mid-section composed of the central fuselage-nacelle flanked by two cellules, at the outer sides of which are located longitudinal vanes which are preferably constructed as a part of the mid-section and are functionally a part of the mid-section of the airfoil to prevent air filtering into the open cellules from the top covered surfaces of the right and left wings.

Further, it is an object of the invention to provide a plane, the rear ends of whose cellules as well as the tops are open, and one the rear part of whose fuselage is triangular in cross section and covered so as to permit a smooth flow of air to the tail assembly.

Further, it is an object to provide an aeroplane of the type stated whose mid-section has a nose or leading edge covered on the top, the space below the covered top of the nose aligning with the cellules being preferably in communication with the open portions or chambers of the cellules whereby the area of low pressure within the airfoil may be extended into the nose.

Further, it is an object to provide an aeroplane of the foregoing description in which the cock pit-nacelle is preferably in communication with the cellules at each side by means of a suitable opening in the side walls of the cock pit, the bottom surface of the cellules and the sides and the bottom walls of the nacelle below the cellules being covered with an air-tight skin.

A further object of the invention is to provide an aeroplane of the open cock pit type in which a central fuselage is provided with an open cock pit, a covered nose and a covered tail portion, and in which two cellules are provided, one at each side of the fuselage and extending from the nose of the fuselage to a place at the rear of the cock pit and along a portion of the sides of the covered tail portion, each cellule comprising a covered nose, sides and a bottom, and each cellule being open at the rear end and on top from the nose of the cellule to its rear end; the bottoms of the cellules extend laterally from the central fuselage and upwardly with the top of their outer sides lying in a common plane above the fuselage and have their adjacent bottom edges alongside the fuselage located approximately about one-half the depth of the fuselage adjacent the cock pit; and wings are located adjacent the outer sides of the cellules with their upper sides in said common plane.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 3 is a front elevation thereof.

Figure 6 is a cross section on the line 6—6 of Figure 4 looking rearwardly.

Figure 1:
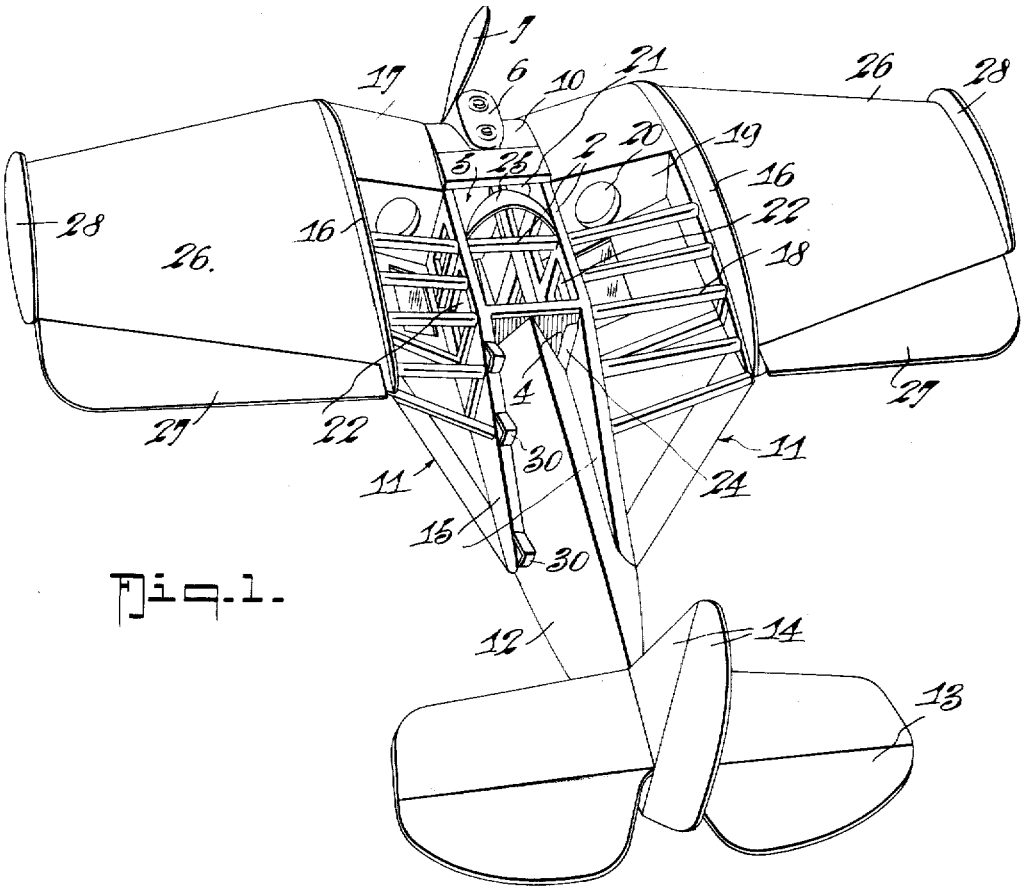
Figure 1 is a perspective view of an aeroplane embodying my invention looking down upon it from the rear.
Figure 5:
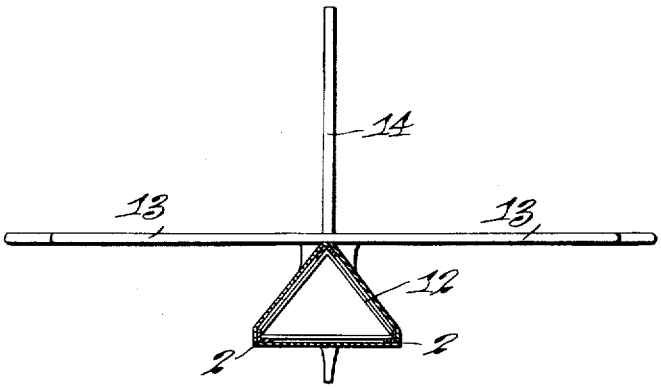
Figure 5 is a cross section on the line 5—5 of Figure 4 looking forwardly.
Figure 2:
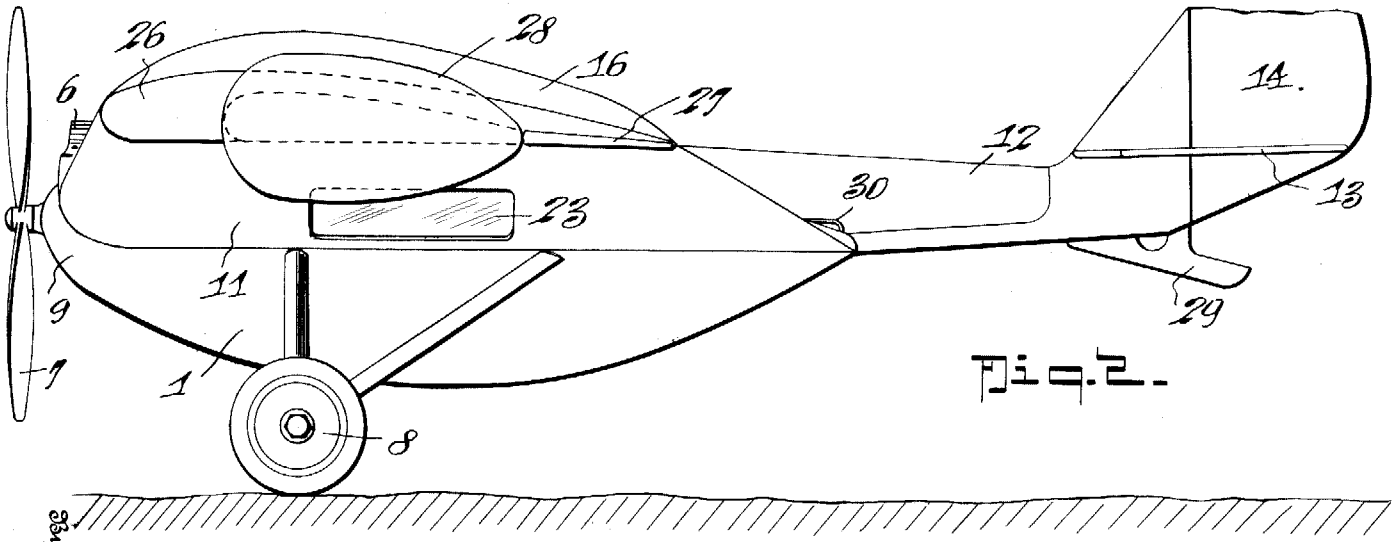
Figure 2 is a side elevation thereof.
Figure 4:
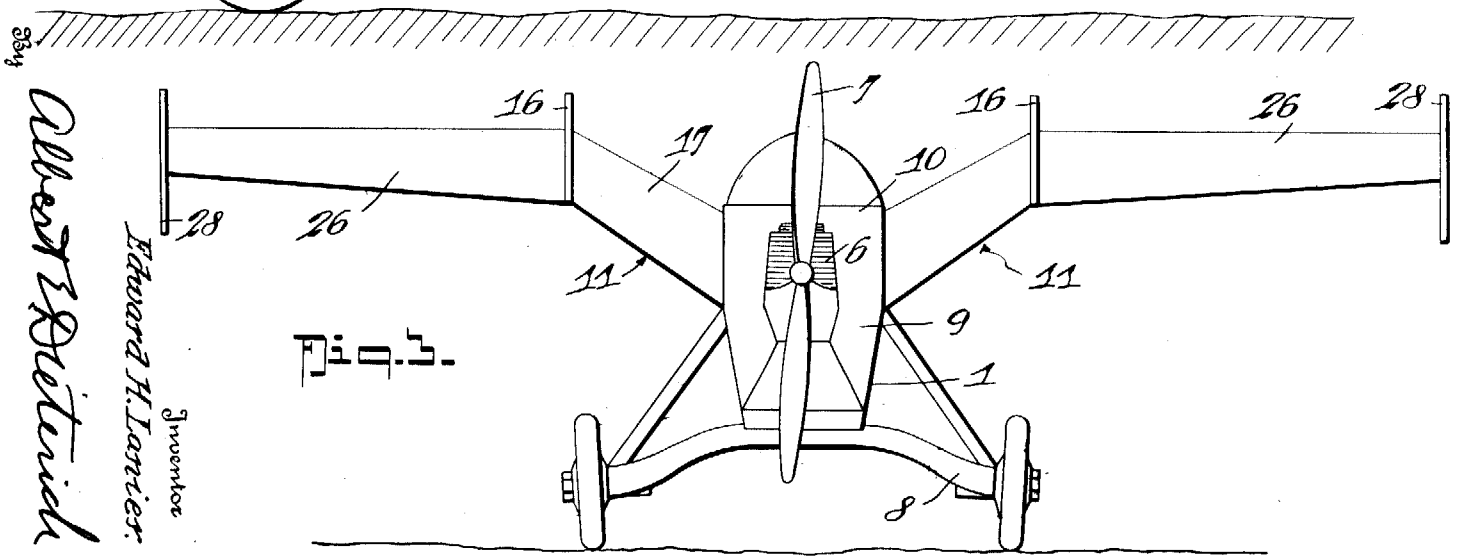
Figure 4 is a central vertical longitudinal section of the invention.
Figure 4:
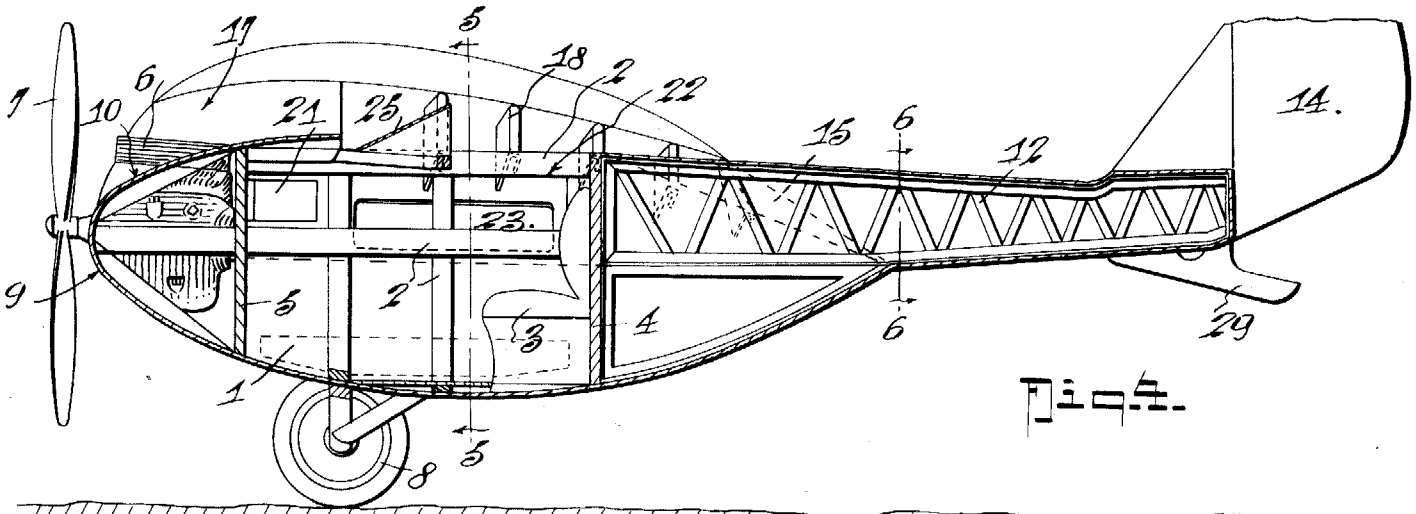
Figure 5:
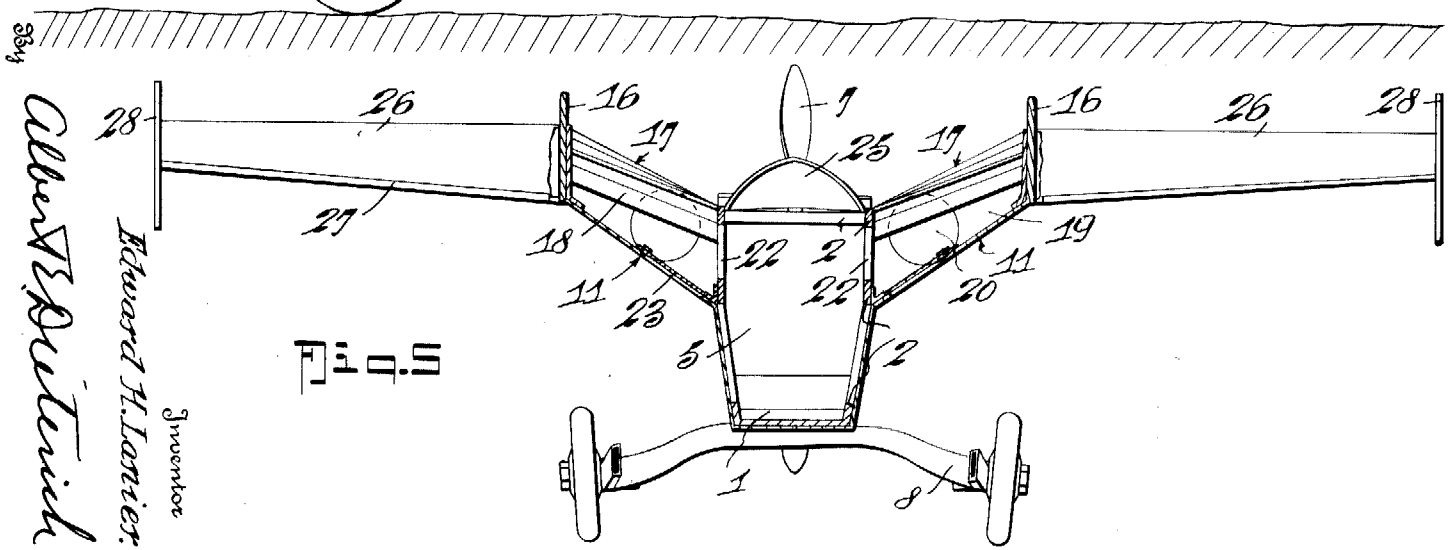

In the drawings in which like numerals of reference indicate like parts in all of the figures, 1 is the nacelle, 2 the fuselage frame and 3 the seat in the cock pit while 4 designates the back wall of the cock pit and 5 designates the front wall thereof. The engine is indicated by 6 and the propeller by 7, it being understood that when the plane is used as a glider the engine and propeller will be omitted.

The machine is provided with the usual landing gear 8 and tail skid 29 as shown. The nose 9 of the nacelle, fuselage, is provided with an upper covering 10. At each side of the central fuselage is a cellule 11 which extends at a dihedral angle to the fuselage, the cellule extending part-way along the tail portion 12 of the fuselage, the latter being composed of a frame triangular in cross section and covered throughout.

Horizontal rudders 13 and vertical rudders 14 are provided at the tail end of the fuselage and those portions of the side walls of the fuselage which extend to the rear of the wing line along the tail 12 are covered, as at 15, to reduce air friction.

16 designates longitudinal vanes at the sides of the mid-section, these vanes constituting a part of the mid-section and are for the purpose of preventing air from the top surfaces of the wings 26 spilling over into the open tops of the cellules 11. The nose of the cellules 11 is covered at the top as at 17, the covering 17 and the covering 10 extending rearwardly to substantially the same distance, but leaving the major part of the cellules uncovered to the extreme rear thereof so that the cellules in this instance are in the nature of troughs, the front ends of which constitute the nose which is covered at the top, while the remainder of the top and the rear end is open.

Each cellule 11 is provided with lateral buffers 18 which are designed to conform to the curvature of the cellules and whose functions are the same as those of the buffers 29 disclosed in my Patent No. 1,779,005.

The cellules are cross-braced at the rear of the nose portions by walls or frames 19 preferably having openings 20 to effect communication between the interior of the nose portions of the cellules and the open top chambered portions thereof. The longitudinal walls between the cock pit and the cellules are preferably provided with openings 21 and 22 so that the area of low pressure may be extended into the cock pit chamber and nacelle. If desired, however, these openings 20 and 21 may be omitted, in which event they would be closed by suitable transparencies so that the aviator could look through the windows 23 in the bottom walls of the cellules 11 for navigation purposes and in order to see his landing gear.

The rear wall 4 may also be provided with openings 24 communicating with the V-shaped channels formed between the covered longitudinal partition walls 15 and the inverted V walls of the tail 12. These pockets formed between 15 and 12 also constitute vacuum or suction chambers.

A suitable wind shield 25 is provided to protect the aviator.

The wings 26 extend laterally from the vanes 16 and may be built rigidly thereto or detachably or foldably secured thereto by methods now well known, which, however, do not per se constitute a part of the present invention. The wings 26 are also provided with the usual ailerons 27 and preferably, through not indispensably, wing tip boards 28 are provided for the usual purpose.

In order that the aviator may enter the cock pit conveniently a series of light skeleton steps 30 are provided on one of the walls 15.

Figure 8:
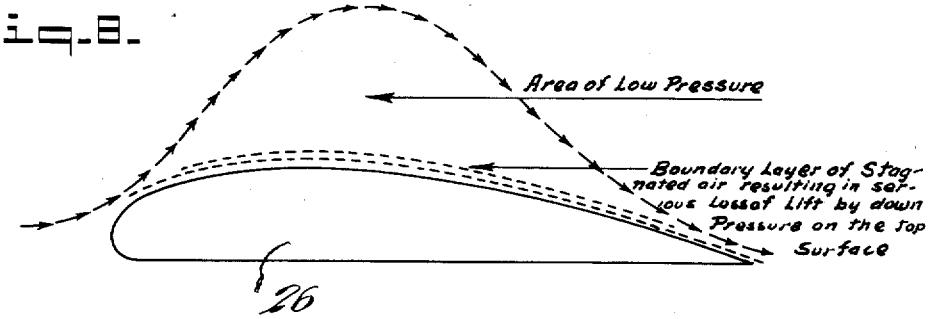
Figure 8 is a diagram of the conventional wing section.

It will be seen that the mid-section of the plane, composed of the fuselage proper and the adjacent cellules, constitutes the center section of the airfoil and is so designed as practically to eliminate the possibility of a crush due to forced landing by materially reducing the landing speed. This result has been accomplished by increasing the lift through the effective removal of what is known as boundary layer—a mass of air lying on the top surface of a conventional wing, resulting in serious down pressure and loss of lift. See Figure 8. Air deflected by the leading edge is thrown back over the wing in a stream. The movement of the stream over the upper surface creates an area of low pressure, into which the wing is drawn giving lift to the entire plane, but all of the air is not deflected. It is this air which creates the boundary layer and prevents the pressure over the upper surface from being nearly so low, as it should be and, therefore, decreases the tendency to lift.

Figure 9:
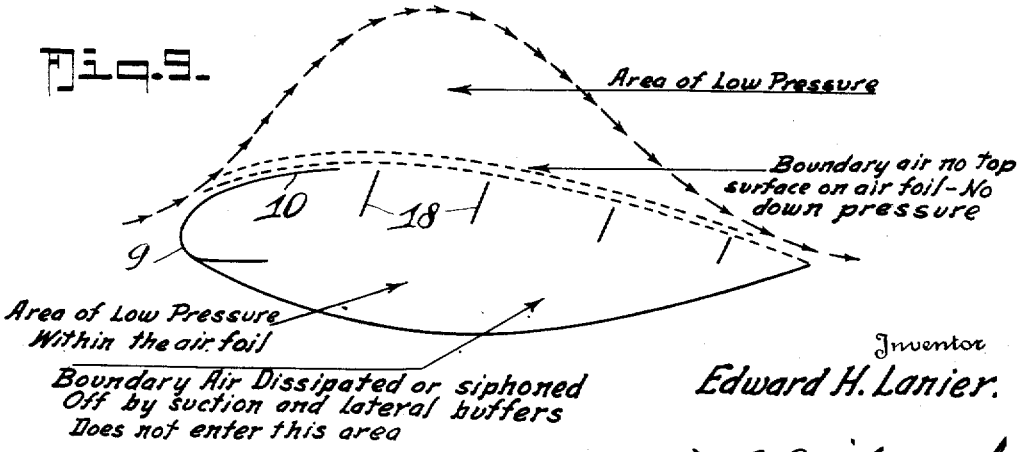
Figure 9 is a diagram of the Vacuplane airfoil srowing the action of the air pressures in flight.

Effective means for removing this boundary layer of down pressure is gained by omitting the top surface cover of the air foil. With no covered top surface subject to down pressure, the boundary layer is dissipated or siphoned off by suction and lateral buffers and does not enter the area of low pressure within the airfoil, see Figure 9.

Figure 7:
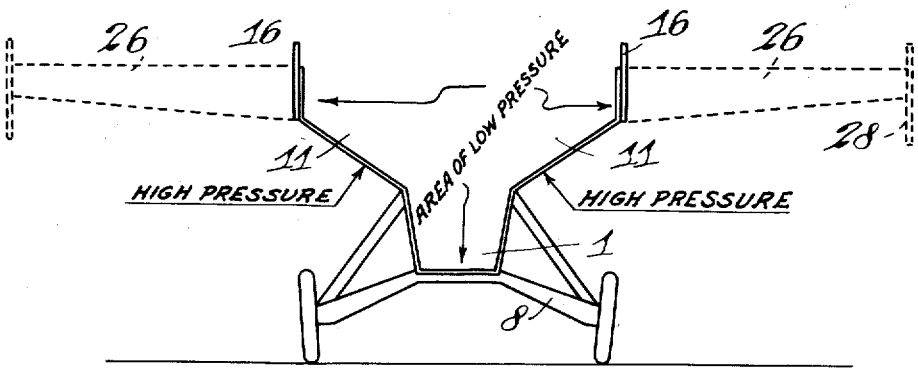
Figure 7 is a diagrammatic cross section of the areoplane, the wings being indicated in dotted lines.

The mid-section as a lift and stabilizing unit bringing into play surface not heretofore used, increases and concentrates the lift over the center of gravity, and the dihedral form, with low pressure within and increased pressures on the outside walls, insures equilibrium. See Figure 7.

This plane is designed so as to reduce the quantity of materials, labor costs and weight to a minimum, without sacrificing quality or strength.

It may be made either as a single-seater or designed to carry more than one person.

In flight rain will not enter the area of the cellule and on the ground gravity permits the water to drain off. The open section of the airfoil is not subject to deterioration from moisture due to good air circulation and it also allows better inspection. The inside bottom skin of the cellules and nacelle can be sprayed with liquid rubber or any resilient water-proof dressing to preserve the skin.

A plane constructed in accordance with my invention to carry a single passenger can be made with a span of fourteen feet, a length of fourteen feet nine inches, a height of four feet six inches and weigh when empty from two hundred and sixty pounds to two hundred and seventy-five pounds. It may be driven by a 27 to 30 horse power motor. Of course, if a plane to carry more than one person is desired it will be made proportionately larger. The gasoline tank may be carried in the bottom of the nacelle or located in the wings as preferred.

From the foregoing description, taken in connection with the accompanying drawings, it is thought the complete construction, operation and advantages of my invention will be clear to those skilled in the art to which it relates.

What I claim is:

1. In aeroplanes, a mid-section comprising a central fuselage proper which includes a covered nose portion, a cockpit and a tail section, and horizontal and vertical rudders carried by the tail section, said mid-section also including two cellules, one at each side of the central fuselage proper, said cellules each having a covered nose merging with that of the fuselage proper and each of said cellules having an open top, the outer sides of said cellules having longitudinal vanes, the bottom surfaces of said cellules and the bottom and side surfaces of said central fuselage proper below the cellules being covered by an air-tight skin, and landing gear carried by the fuselage proper.

2. In aeroplanes, a mid-section comprising a central fuselage proper which includes a covered nose portion, a cockpit and a tail section, and horizontal and vertical rudders carried by the tail section, said mid-section also including two cellules, one at each side of the central fuselage proper, said cellules each having a covered nose merging with that of the fuselage proper and each of said cellules having an open top, the outer sides of said cellules having longitudinal vanes, the bottom surfaces of said cellules and the bottom and side surfaces of said central fuselage proper below the cellules being covered by an air-tight skin, and landing gear carried by the fuselage proper, said open top extending to the rear end of the cellules, the rear ends thereof being open, and the bottoms of said cellules making a dihedral angle with the fuselage proper.

3. In aeroplanes, a mid-section comprising a central fuselage proper which includes a covered nose portion, a cockpit and a tail section, and horizontal and vertical rudders carried by the tail section, said mid-section also including two cellules, one at each side of the central fuselage proper, said cellules each having a covered nose merging with that of the fuselage proper and each of said cellules having an open top, the outer sides of said cellules having longitudinal vanes, the bottom surfaces of said cellules and the bottom and side surfaces of said central fuselage proper below the cellules being covered by an air-tight skin, landing gear carried by the fuselage proper, and wings secured to the outer sides of said cellules and extending laterally therefrom.

4. In aeroplanes, a mid-section comprising a central fuselage proper which includes a covered nose portion, a cockpit and a tail section and horizontal and vertical rudders carried by the tail section, said mid-section also including two cellules, one at each side of the central fuselage proper, said cellules each having a covered nose merging with that of the fuselage proper and each of said cellules having an open top, the outer sides of said cellules having longitudinal vanes, the bottom surfaces of said cellules and the bottom and side surfaces of said central fuselage proper below the cellules being covered by an air-tight skin, landing gear carried by the fuselage proper, said open top extending to the rear end of the cellules, the rear ends thereof being open, the bottoms of said cellules making a dihedral angle with the fuselage proper, and wings secured to the outer sides of said cellules and extending laterally therefrom.

5. In aeroplanes, a mid-section comprising a central fuselage proper which includes a covered nose portion, a cockpit and a tail section, and horizontal and vertical rudders carried by the tail section, said mid-section also including two cellules, one at each side of the central fuselage proper, said cellules each having a covered nose merging with that of the fuselage proper and each of said cellules having on open top, the outer sides of said cellules having longitudinal vanes, the bottom surfaces of said cellules and the bottom and side surfaces of said central fuselage proper below the cellules being covered by an air-tight skin, landing gear carried by the fuselage proper, wings secured to the outer sides of said cellules and extending laterally therefrom, and wing tip boards on the lateral extremities of said wings.

6. In aeroplanes, a mid-section comprising a central fuselage proper which includes a covered nose portion, a cockpit and a tail section, and horizontal and vertical rudders carried by the tail section, said mid-section also including two cellules, one at each side of the central fuselage proper, said cellules each having a covered nose merging with that of the fuselage proper and each of said cellules having an open top, the outer sides of said cellules having longitudinal vanes, the bottom surfaces of said cellules and the bottom and side surfaces of said central fuselage proper below the cellules being covered by an air-tight skin, landing gear carried by the fuselage proper, said open top extending to the rear end of the cellules, the rear ends thereof being open, the bottoms of said cellules making a dihedral angle with the fuselage proper, wings secured to the outer sides of said cellules and extending laterally therefrom, and wing tip boards on the lateral extremities of said wings.

7. In aeroplanes, a mid-section comprising a central fuselage proper which includes a covered nose portion, a cockpit and a tail section, an engine within the nose section of the fuselage proper and a propeller driven by the engine, and horizontal and vertical rudders carried by the tail section, said mid-section also including two cellules, one at each side of the central fuselage proper, said cellules each having a covered nose merging with that of the fuselage proper and each of said cellules having an open top, the outer sides of said cellules having longitudinal vanes, the bottom surfaces of said cellules and the bottom and side surfaces of said central fuselage proper below the cellules being covered by an air-tight skin, and landing gear carried by the fuselage proper.

8. In aeroplanes, a mid-section comprising a central fuselage proper which includes a covered nose portion, a cockpit and a tail section, and horizontal and vertical rudders carried by the tail section, said mid-section also including two cellules, one at each side of the central fuselage proper, said cellules each having a covered nose merging with that of the fuselage proper and each of said cellules having an open top, the outer sides of said cellules having longitudinal vanes, the bottom surfaces of said cellules and the bottom and side surfaces of said central fuselage proper below the cellules being covered by an air-tight skin, and landing gear carried by the fuselage proper, the side walls of the fuselage having openings above the bottoms of the cellules to effect communication between the nacelle and the open top chambers of the cellules.

9. In aeroplanes, a mid-section comprising a central fuselage proper which includes a covered nose portion, a cockpit and a tail section, and horizontal and vertical rudders carried by the tail section, said mid-section also including two cellules, one at each side of the central fuselage proper, said cellules each having a covered nose merging with that of the fuselage proper and each of said cellules having an open top, the outer sides of said cellules having longitudinal vanes, the bottom surfaces of said cellules and the bottom and side surfaces of said central fuselage proper below the cellules being covered by an air-tight skin, and landing gear carried by the fuselage proper, said open top extending to the rear end of the cellules, the rear ends thereof being open, and the bottoms of said cellules making a dihedral angle with the fuselage proper the side walls of the fuselage having openings above the bottoms of the cellules to effect communication between the nacelle and the open top chambers of the cellules.

10. In aeroplanes, a mid-section comprising a central fuselage proper which includes a covered nose portion, a cockpit and a tail section, and horizontal and vertical rudders carried by the tail section, said mid-section also including two cellules, one at each side of the central fuselage proper, said cellules each having a covered nose merging with that of the fuselage proper and each of said cellules having an open top, the outer sides of said cellules having longitudinal vanes, the bottom surfaces of said cellules and the bottom and side surfaces of said central fuselage proper below the cellules being covered by an air-tight skin, landing gear carried by the fuselage proper, and wings secured to the outer sides of said cellules and extending laterally therefrom, the side walls of the fuselage having openings above the bottoms of the cellules to effect communication between the nacelle and the open top chambers of the cellules.

11. In aeroplanes, a mid-section comprising a central fuselage proper which includes a covered nose portion, a cockpit and a tail section, and horizontal and vertical rudders carried by the tail section, said mid-section also including two cellules, one at each side of the central fuselage proper, said cellules each having a covered nose merging with that of the fuselage proper and each of said cellules having longitudinal vanes, the bottom surfaces of said cellules and the bottom and side surfaces of said central fuselage proper below the cellules being covered by an air-tight skin, landing gear carried by the fuselage proper, said open top extending to the rear ends of the cellules, the rear ends thereof being open, the bottoms of said cellules making a dihedral angle with the fuselage proper, and wings secured to the outer sides of said cellules and extending laterally therefrom, the side walls of the fuselage having openings above the bottoms of the cellules to effect communication between the nacelle and the open top chambers of the cellules.

12. In aeroplanes of the type specified, a mid-section and wing sections extending laterally therefrom, said mid-section including a fuselage proper with a cockpit and a tail extending to the rear thereof, landing gear carried by the fuselage proper and horizontal and vertical rudders carried by the tail, said mid-section also including a cellule at each side of the fuselage having chambers open at the top from the nose to the extreme rear end, the mid-section also being open at the extreme rear end for the purposes described.

13. In aeroplanes of the type specified, a mid-section and wing sections extending laterally therefrom, said mid-section including a fuselage proper with a cockpit and a tail extending to the rear thereof, landing gear carried by the fuselage proper and horizontal and vertical rudders carried by the tail, said mid-section also including a cellule at each side of the fuselage having open top chambers, said cellules having transverse buffers in their chambers, and said cellules and said fuselage proper having a covered nose.

14. In aeroplanes of the type specified, a mid-section and wing sections extending laterally therefrom, said mid-section including a fuselage proper with a cockpit and a tail extending to the rear thereof, landing gear carried by the fuselage proper and horizontal and vertical rudders carried by the tail, said mid-section also including a cellule at each side of the fuselage having open top chambers, said cellules having transverse buffers in their chambers, and said cellules and said fuselage proper having a covered nose, those portions of which that are in alignment with the open top chambers of the cellules being in communication with said chambers.

15. In aeroplanes of the type specified, a mid-section and wing sections extending laterally therefrom, said mid-section including a fuselage proper with a cockpit and a tail extending to the rear thereof, landing gear carried by the fuselage proper and horizontal and vertical rudders carried by the tail, said mid-section also including a cellule at each side of the fuselage having open top chambers, there being walls between the fuselage proper and the cellules, which walls have openings communicating with the open top chambers of the cellules.

16. In aeroplanes of the type specified, a mid-section and wing sections extending laterally therefrom, said mid-section including a fuselage proper with a cockpit and a tail extending to the rear thereof, landing gear carried by the fuselage proper and horizontal and vertical rudders carried by the tail, said mid-section also including a cellule at each side of the fuselage having open top chambers, said cellules having transverse buffers in their chambers, and said cellules and said fuselage proper having a covered nose, there being walls between the fuselage proper and the cellules, which walls have openings communicating with the open top chambers of the cellules.

17. In aeroplanes of the type specified, a mid-section and wing sections extending laterally therefrom, said mid-section including a fuselage proper with a cockpit and a tail extending to the rear thereof, landing gear carried by the fuselage proper and horizontal and vertical rudders carried by the tail, said mid-section also including a cellule at each side of the fuselage having open top chambers, said cellules having transverse buffers in their chambers, and said cellules and said fuselage proper having a covered nose, those portions of which that are in alignment with the open top chambers of the cellules being in communication with said chambers, there being walls between the fuselage proper and the cellules, which walls have openings communicating with the open top chambers of the cellules.

18. In aeroplanes of the type specified, a mid-section and wing sections extending laterally therefrom, said mid-section including a fuselage proper with a cockpit and a tail extending to the rear thereof, landing gear carried by the fuselage proper and horizontal and vertical rudders carried by the tail, said mid-section also including a cellule at each side of the fuselage having open top chambers, there being longitudinal vanes between the outer sides of the cellules and the adjacent wings.

19. In aeroplanes of the type specified, a mid-section and wing sections extending laterally therefrom, said mid-section including a fuselage proper with a cockpit and a tail extending to the rear thereof, landing gear carried by the fuselage proper and horizontal and vertical rudders carried by the tail, said mid-section also including a cellule at each side of the fuselage having open top chambers, said cellules having transverse buffers in their chambers, and said cellules and said fuselage proper having a covered nose, there being longitudinal vanes between the outer sides of the cellules and the adjacent wings.

20. In aeroplanes of the type specified, a mid-section and wing sections extending laterally therefrom, said mid-section including a fuselage proper with a cockpit and a tail extending to the rear thereof, landing gear carried by the fuselage proper and horizontal and vertical rudders carried by the tail, said mid-section also including a cellule at each side of the fuselage having open top chambers, said cellules having transverse buffers in their chambers, and said cellules and said fuselage proper having a covered nose, those portions of which that are in alignment with the open top chambers of the cellules being in communication with said chambers, there being longitudinal vanes between the outer sides of the cellules and the adjacent wings.

21. In aeroplanes, an air-foil or cellule comprising a center section and two side sections having an air-tight skin on its bottom and sides and over its nose or entering edge, remainder of the top of the air-foil from the nose to the rear end being open, and transverse air buffers located in spaced relation in the side sections of the cellule between the nose and the rear end.

22. In aeroplanes, an air-foil or cellule having a central section and two side sections and having an air-tight skin on its bottom and sides and over its nose or entering edge, the remainder of the top of the center and side sections from the nose to the rear end being open.

23. In aeroplanes, a central open cockpit type fuselage which comprises a covered nose portion, a cockpit and a tail portion and horizontal and vertical rudders carried by said tail portions; cellules located at each side of said fuselage, each cellule including a laterally and upwardly extended covered bottom surface, sides and a covered nose, the latter merging with that of the nose portion of the cockpit, each cellule having its top open from side to side and from its nose to its rear end, a wing extending laterally from the outer side of each cellule; and a landing gear for supporting the aforesaid structure when at rest.

24. In aeroplanes, a central open cockpit type fuselage which comprises a covered nose portion, a cockpit and a tail portion and horizontal and vertical rudders carried by said tail portions; cellules located at each side of said fuselage, each cellule including a laterally and upwardly extended covered bottom surface, sides and a covered nose, the latter merging with that of the nose portion of the cockpit, each cellule having its top open from side to side and from its nose to its rear end, said cellules being of a depth, adjacent the cockpit, of approximately half the depth of the cockpit portion of the fuselage; a wing extending laterally from the outer side of each cellule; and a landing gear for supporting the aforesaid structure when at rest.

25. In aeroplanes, a central open cockpit type fuselage which comprises a covered nose portion, a cockpit and a tail portion and horizontal and vertical rudders carried by said tail portion; cellules located at each side of said fuselage, each cellule including a laterally and upwardly extended covered bottom surface, sides and a covered nose, the latter merging with that of the nose portion of the cockpit, each cellule having its top open from side to side and from its nose to its rear end, said cellules being of a depth, adjacent the cockpit, of approximately half the depth of the cockpit portion of the fuselage and the upper outer edges of said cellules lying in a common plane above the top of the fuselage; a wing extending laterally from the outer side of each cellule; and a landing gear for supporting the aforesaid structure when at rest.

26. In aeroplanes, a central open cockpit type fuselage which comprises a covered nose portion, a cockpit and a tail portion and horizontal and vertical rudders carried by said tail portion, the tail portion of the fuselage being covered; cellules located at each side of said fuselage, each cellule including a laterally and upwardly extended covered bottom surface, sides and a covered nose, the latter merging with that of the nose portion of the cockpit; each cellule having its top open from side to side and from its nose to its rear end; a wing extending laterally from the outer side of each cellule; and a landing gear for supporting the aforesaid structure when at rest.

27. In aeroplanes, a central open cockpit type fuselage which comprises a covered nose portion, a cockpit and a tail portion and horizontal and vertical rudders carried by said tail portion; cellules located at each side of said fuselage, each cellule including a laterally and upwardly extended covered bottom surface, sides and a covered nose, the latter merging with that of the nose portion of the cockpit; each cellule having its top open from side to side and from its nose to its rear end; a wing extending laterally from the outer side of each cellule, the upper edges of the outer sides of said cellules and the top surfaces of said wings lying in a common plane above the fuselage; and a landing gear for supporting the aforesaid structure when at rest.

28. In aeroplanes, a mid-section, comprising a central fuselage proper which includes a covered nose portion, a cockpit and a tail section, and horizontal and vertical rudders carried by the tail section, said mid-section also including two cellules, one extending laterally from each side of the central fuselage proper, said cellules each having a covered nose merging with that of the fuselage proper and each of said cellules having an open top, the bottom surfaces of said central fuselage proper below the cellules being covered by an air-tight skin, landing gear carried by the fuselage proper, and wings extending laterally from the outer sides of the cellules.

29. In aeroplanes, a mid-section, comprising a central fuselage proper which includes a covered nose portion, a cockpit and a tail section, and horizontal and vertical rudders carried by the tail section, said mid-section also including two cellules, one extending laterally from each side of the central fuselage proper, said cellules each having a covered nose merging with that of the fuselage proper and each of said cellules having an open top, the bottom surfaces of said central fuselage proper below the cellules being covered by an air-tight skin, the bottoms of said cellules making a dihedral angle to the fuselage proper and the bottom edges of the sides of said cellules which are adjacent the cockpit being located below the top of the fuselage proper while the outer top edges of the cellules lie in a common plane above the cockpit; landing gear carried by the fuselage proper; and wings extending laterally from the outer sides of the cellules.

30. In aeroplanes, a mid-section, comprising a central fuselage proper which includes a covered nose portion, a cockpit and a tail section, and horizontal and vertical rudders carried by the tail section, said mid-section also including two cellules, one extending laterally from each side of the central fuselage proper, said cellules each having a covered nose merging with that of the fuselage proper and each of said cellules having an open top, the bottom surfaces of said central fuselage proper below the cellules being covered by an air-tight skin, the bottoms of said cellules making a dihedral angle to the fuselage proper and the bottom edges of the sides of said cellules which are adjacent the cockpit being located below the top of the fuselage proper while the outer top edges of the cellules lie in a common plane above the cockpit; landing gear carried by the fuselage proper; and wings extending laterally from the outer sides of the cellules and having their top surfaces lying approximately in said common plane.

EDWARD H. LANIER.